United States Patent
Imana

(10) Patent No.: US 9,317,073 B2
(45) Date of Patent: Apr. 19, 2016

(54) DEVICE OFF-PLANE SURFACE TOUCH ACTIVATION

(71) Applicant: Kobo Inc., Toronto (CA)

(72) Inventor: Juan Ernesto Salas Imana, Toronto (CA)

(73) Assignee: Rakuten Kobo Inc., Toronto (CA)

(*) Notice: Subject to any disclaimer, the term of this patent is extended or adjusted under 35 U.S.C. 154(b) by 0 days.

(21) Appl. No.: 14/297,453

(22) Filed: Jun. 5, 2014

(65) Prior Publication Data
US 2015/0355683 A1    Dec. 10, 2015

(51) Int. Cl.
G06F 3/041 (2006.01)
G06F 1/16 (2006.01)
G06F 3/0354 (2013.01)
G09G 5/00 (2006.01)

(52) U.S. Cl.
CPC ............ *G06F 1/1692* (2013.01); *G06F 1/1626* (2013.01); *G06F 3/03547* (2013.01); *G09G 5/003* (2013.01); *G09G 2330/026* (2013.01); *G09G 2330/027* (2013.01); *G09G 2354/00* (2013.01); *G09G 2380/14* (2013.01)

(58) Field of Classification Search
CPC ..... G06F 3/041; G06F 3/0416; G06F 3/0412; G06F 3/04883; G06F 3/0488; G06F 3/016; G06F 3/044; G06F 3/03545
See application file for complete search history.

(56) References Cited

U.S. PATENT DOCUMENTS

2007/0144795 A1* 6/2007 Tran .................... 178/18.06
2008/0036744 A1* 2/2008 Hartl ..................... 345/173

FOREIGN PATENT DOCUMENTS

GB    2471178 A  * 12/2010    ........... G06F 3/041

* cited by examiner

*Primary Examiner* — Olga Merkoulova
(74) *Attorney, Agent, or Firm* — Oblon, McClelland, Maier & Neustadt, L.L.P.

(57) ABSTRACT

A computing device includes a housing and a display assembly having a screen. The housing at least partially circumvents the screen so that the screen is viewable. A touch sensor is provided with a portion of the housing having a different planar orientation than a remainder of the housing. For example, the touch sensor may be provided with a portion of the housing that is off-plane with the screen of the display assembly. A processor is provided within the housing to detect a first user interaction with the touch sensor, and to interpret the first user interaction as a first user input. The processor further executes one or more instructions in response to the first user input.

20 Claims, 6 Drawing Sheets

DEVICE OFF-PLANE SURFACE TOUCH ACTIVATION

TECHNICAL FIELD

Examples described herein relate to a computing device having a touch sensor formed on a non-planar housing surface.

BACKGROUND

An electronic personal display is a mobile electronic device that displays information to a user. While an electronic personal display is generally capable of many of the functions of a personal computer, a user can typically interact directly with an electronic personal display without the use of a keyboard that is separate from or coupled to but distinct from the electronic personal display itself. Some examples of electronic personal displays include mobile digital devices/tablet computers such (e.g., Apple iPad®, Microsoft® Surface™, Samsung Galaxy Tab®ature and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, and the like).

An electronic reader, also known as an e-reader device, is an electronic personal display that is used for reading electronic books (eBooks), electronic magazines, and other digital content. For example, digital content of an e-book is displayed as alphanumeric characters and/or graphic images on a display of an e-reader such that a user may read the digital content much in the same way as reading the analog content of a printed page in a paper-based book. An e-reader device provides a convenient format to store, transport, and view a large collection of digital content that would otherwise potentially take up a large volume of space in traditional paper format.

In some instances, e-reader devices are purpose-built devices designed to perform especially well at displaying readable content. For example, a purpose built e-reader device includes a display that reduces glare, performs well in highly lit conditions, and/or mimics the look of text on actual paper. While such purpose built e-reader devices excel at displaying content for a user to read, they can also perform other functions, such as displaying images, emitting audio, recording audio, and web surfing, among others.

There also exist numerous kinds of consumer devices that can receive services and resources from a network service. Such devices can operate applications or provide other functionality that links the device to a particular account of a specific service. For example, e-reader devices typically link to an online bookstore, and media playback devices often include applications which enable the user to access an online media library. In this context, the user accounts can enable the user to receive the full benefit and functionality of the device.

DETAILED DESCRIPTION

Figure 1:
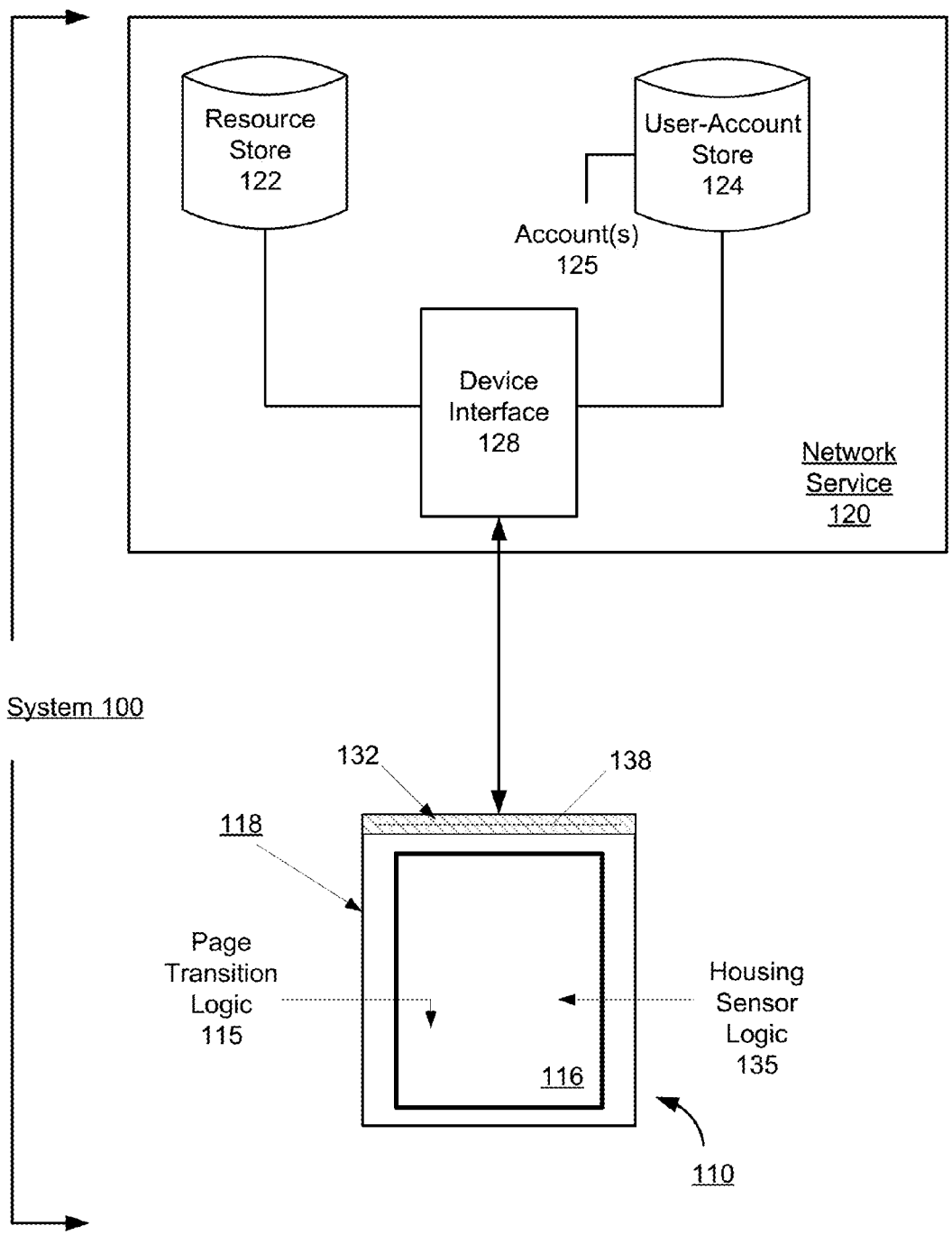
FIG. 1 illustrates a system for utilizing applications and providing e-book services on a computing device, according to an embodiment.

Embodiments described herein provide for a computing device having a touch-sensitive activation plane. The activation plane may be formed on a surface (e.g., front or back) of a housing of the computing device. In some embodiments, the activation plane may be provided with a portion of the housing having a different planar orientation than a remainder of the housing. Having a distinct planar orientation enables the activation plane to be readily identifiable, to a user, as a touch-sensitive input feature of the computing device As used herein, the term "plane" is intended to mean a substantially flat or level surface (e.g., of a housing). Accordingly, the terms "plane" and "surface" may be used herein interchangeably. Furthermore, the term "planar" may be refer to a two-dimensional quality (e.g., of an object or surface). For example, a "non-planar" surface may be used to describe a surface that is not flat. On the other hand, a "planar orientation" may be characterized by the coordinate axes on which a particular plane lies. Still further, two or more planes may be referred to as "off-plane" if they are non-parallel.

Still further, in some embodiments, a computing device includes a housing and a display assembly having a screen. The housing at least partially circumvents the screen so that the screen is viewable. A touch sensor is provided with a portion of the housing having a different planar orientation than a remainder of the housing. For example, the touch sensor may be provided with a portion of the housing that is off-plane with the screen of the display assembly. A processor is provided within the housing to detect a first user interaction with the touch sensor, and to interpret the first user interaction as a first user input. The processor further executes one or more instructions in response to the first user input.

The one or more instructions executed by the processor may cause a change in state of the display screen. For example, the one or more instructions may include: instructions for powering on or powering of the display; instructions for launching or closing an application; instructions for invoking or closing a system menu; and/or instructions for perform a page turn. For some embodiments, the first user interaction may correspond with a finger tap on the touch sensor. For other embodiments, the first user interaction may correspond to a gesture, for example, such as a finger swiping across a surface of the touch sensor.

For some embodiments, the housing may include a non-planar back surface, wherein the touch sensor may be provided on a first plane of the back surface. More specifically, the touch sensor may substantially encompass the first plane of the back surface. Accordingly, the first plane of the back surface may correspond with the activation plane. In some embodiments, the first plane may have a different size, shape, and/or orientation than each remaining plane of the back surface. For example, the first plane may have an asymmetric shape to help guide a user's finger.

For other embodiments, the housing may include a nonplanar front surface, wherein the touch sensor is provided on a first plane of the front surface. More specifically, the touch sensor may substantially encompass the first plane of the front surface. Accordingly, the first plane of the front surface may correspond with the activation plane. In some embodiments, the first plane may have a different size, shape and/or orientation than each remaining plane of the front surface.

Among other benefits, examples described herein enable a personal display device such as an e-reader device to receive touch-based inputs via an activation plane provided with a housing of the device. More specifically the planar orientation of the activation plane helps intuitively guide or direct user input to the touch sensor provided thereon without relying on text, colors, and/or other markers to indicate or otherwise point out the location of the sensor.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer programs, or a computer usable carrier medium capable of carrying such a program.

System Description

FIG. 1 illustrates a system 100 for utilizing applications and providing e-book services on a computing device, according to an embodiment. In an example of FIG. 1, system 100 includes an electronic display device, shown by way of example as an e-reader device 110, and a network service 120. The network service 120 can include multiple servers and other computing resources that provide various services in connection with one or more applications that are installed on the e-reader device 110. By way of example, in one implementation, the network service 120 can provide e-book services which communicate with the e-reader device 110. The e-book services provided through network service 120 can, for example, include services in which e-books are sold, shared, downloaded and/or stored. More generally, the network service 120 can provide various other content services, including content rendering services (e.g., streaming media) or other network-application environments or services.

The e-reader device 110 can correspond to any electronic personal display device on which applications and application resources (e.g., e-books, media files, documents) can be rendered and consumed. For example, the e-reader device 110 can correspond to a tablet or a telephony/messaging device (e.g., smart phone). In one implementation, for example, e-reader device 110 can run an e-reader application that links the device to the network service 120 and enables e-books provided through the service to be viewed and consumed. In another implementation, the e-reader device 110 can run a media playback or streaming application that receives files or streaming data from the network service 120. By way of example, the e-reader device 110 can be equipped with hardware and software to optimize certain application activities, such as reading electronic content (e.g., e-books). For example, the e-reader device 110 can have a tablet-like form factor, although variations are possible. In some cases, the e-reader device 110 can also have an E-ink display.

In additional detail, the network service 120 can include a device interface 128, a resource store 122 and a user account store 124. The user account store 124 can associate the e-reader device 110 with a user and with an account 125. The account 125 can also be associated with one or more application resources (e.g., e-books), which can be stored in the resource store 122. As described further, the user account store 124 can retain metadata for individual accounts 125 to identify resources that have been purchased or made available for consumption for a given account. The e-reader device 110 may be associated with the user account 125, and multiple devices may be associated with the same account. As described in greater detail below, the e-reader device 110 can store resources (e.g., e-books) that are purchased or otherwise made available to the user of the e-reader device 110, as well as to archive e-books and other digital content items that have been purchased for the user account 125, but are not stored on the particular computing device.

With reference to an example of FIG. 1, e-reader device 110 can include a display screen 116 and a housing 118. In an embodiment, the display screen 116 is touch-sensitive, to process touch inputs including gestures (e.g., swipes). Additionally, the housing 118 may be integrated with one or more touch sensors 138 to provide a touch sensing region 132 on a surface of the housing 118. For some embodiments, the one or more touch sensors 138 may include capacitive sensors that can sense or detect a human body's capacitance as input. In the example of FIG. 1, the touch sensing region 132 is provided on the bezel of the housing 118, such as on a periphery of the display screen 116 and/or on a back surface (not shown) of the housing 118. More specifically, in some embodiments, the touch sensing region 132 is provided on a particular surface or region of the housing 118 (e.g., an activation plane) that has a different planar orientation than the remaining surfaces of the housing 118. For example, the activation plane may form acute and/or obtuse angles with one or more adjacent planes or surfaces of the housing 118, while the remaining planes of the housing 118 may be substantially perpendicular to one another.

The distinct planar orientation of the touch sensing region 132 may help guide or direct user input to the touch sensors 138. For example, because the touch sensing region 132 is provided on a surface of the housing 118 that is substantially off-plane with the remainder of the housing, a user may intuitively interact with the touch sensors 138 to provide user input. In contrast, conventional e-reader devices typically implement mechanical buttons and/or switches on the housing. While mechanical buttons and switches can clearly highlight user input functionality on the device, the mechanical actuation mechanisms often wear down and/or break over time, which may result in a complete loss of functionality. Furthermore, mechanical buttons may prevent the device from having a flush (e.g., sleek or substantially uniform) form factor that is pleasing to the eyes. However, the off-plane touch sensing region 132 helps accentuate or otherwise draw attention to the touch sensors 138 without the need for text, colors, markers, and/or other indicators that may detract from the overall appearance of the e-reader device 110.

According to some embodiments, the e-reader device 110 includes housing sensor logic 135 to detect and interpret user input made through interaction with the housing touch sensors 138. By way of example, the housing sensor logic 135 can detect taps, multiple taps or gestures made through user interaction with the touch sensing regions 132. The housing sensor logic 135 can interpret such input received through the sensing regions 132 in a variety of ways. For some embodiments, each user input may be interpreted as a change in state of the display screen 116. For example, a user may tap the touch sensing region 132 to power on and/or power off the display screen 116. Alternatively, or in addition, the user may tap the touch sensing region 132 to invoke and/or close a system menu or sub-menu. Still further, the user may launch and/or close applications by tapping the touch sensing region 132. In the context of an e-book application, the user can enter input through the touch sensing region 132 to, for example, mark a page or a passage.

In some embodiments, the e-reader device 110 includes features for providing and enhancing functionality related to displaying paginated content. The e-reader device can include page transitioning logic 115, which enables the user to transition through paginated content. The e-reader device can display pages from e-books, and enable the user to transition from one page state to another. In particular, an e-book can provide content that is rendered sequentially in pages, and the e-book can display page states in the form of single pages, multiple pages or portions thereof. Accordingly, a given page state can coincide with, for example, a single page, or two or more pages displayed at once. The page transitioning logic 115 can operate to enable the user to transition from a given page state to another page state. In some implementations, the page transitioning logic 115 enables single page transitions, chapter transitions, or cluster transitions (multiple pages at one time).

The page transitioning logic 115 can be responsive to various kinds of interfaces and actions in order to enable page transitioning. In one implementation, the user can signal a page transition event to transition page states by, for example, interacting with the touch sensing region 132. For example, the user can swipe the touch sensing region 132 in a particular direction (e.g., up, down, left, or right) to indicate a sequential direction of a page transition. In variations, the user can specify different kinds of page transitioning input (e.g., single page turns, multiple page turns, chapter turns) through different kinds of input. Additionally, the page turn input of the user can be provided with a magnitude to indicate a magnitude (e.g., number of pages) in the transition of the page state. For example, a user can touch and hold the touch sensing region 132 in order to cause a cluster or chapter page state transition, while a tap in the same region can effect a single page state transition (e.g., from one page to a next in sequence). In another example, a use can specify page turns of different kinds or magnitudes through single taps, sequenced taps or patterned taps on the touch sensing region 132.

Hardware Description

Figure 2:
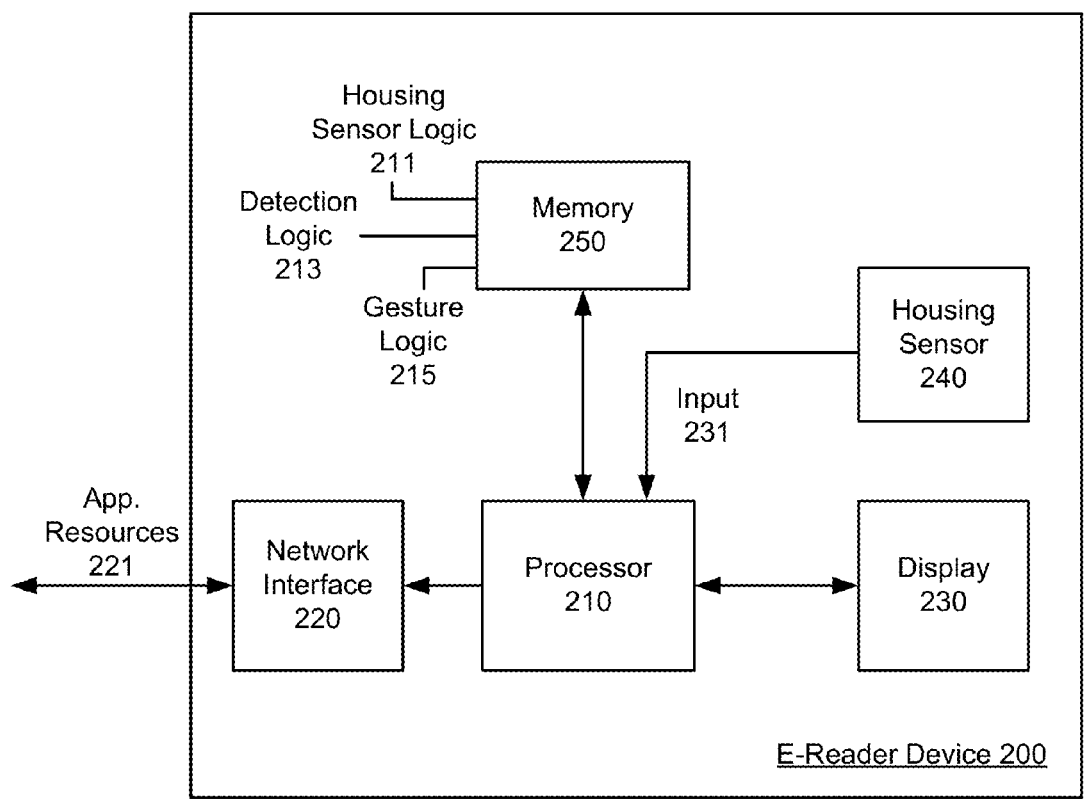
FIG. 2 illustrates an example of an e-reader device or other electronic personal display device, for use with one or more embodiments described herein.

FIG. 2 illustrates an example of an e-reader device 200 or other electronic personal display device, for use with one or more embodiments described herein. In an example of FIG. 2, an e-reader device 200 can correspond to, for example, the device 110 as described above with respect to FIG. 1. With reference to FIG. 2, e-reader device 200 includes a processor 210, a network interface 220, a display 230, one or more housing sensor components 240, and a memory 250.

The processor 210 can implement functionality using instructions stored in the memory 250. Additionally, in some implementations, the processor 210 utilizes the network interface 220 to communicate with the network service 120 (see FIG. 1). More specifically, the e-reader device 200 can access the network service 120 to receive various kinds of resources (e.g., digital content items such as e-books, configuration files, account information), as well as to provide information (e.g., user account information, service requests etc.). For example, e-reader device 200 can receive application resources 221, such as e-books or media files, that the user elects to purchase or otherwise download from the network service 120. The application resources 221 that are downloaded onto the e-reader device 200 can be stored in the memory 250.

In some implementations, the display 230 can correspond to, for example, a liquid crystal display (LCD) or light emitting diode (LED) display that illuminates in order to provide content generated from processor 210. In some implementations, the display 230 can be touch-sensitive. In some variations, the display 230 can correspond to an electronic paper type display, which mimics conventional paper in the manner in which content is displayed. Examples of such display technologies include electrophoretic displays, electrowetting displays, and electrofluidic displays.

The processor 210 can receive input from various sources, including the housing sensor components 240, the display 230, and/or other input mechanisms (e.g., buttons, keyboard, mouse, microphone, etc.). With reference to examples described herein, the processor 210 can respond to input 231 from the housing sensor components 240. In some embodiments, one or more of the housing sensor components 240 are provided on a portion of a housing of the e-reader device 200 that has a different planar orientation than a remainder of the housing. For example, the housing sensor components 240 may be provided on a housing surface that is substantially off-plane from all other housing surfaces of the e-reader device 200.

In some embodiments, the memory 250 may store housing sensor logic 111 that monitors for touch input provided through the housing sensor components 240, and further processes the input as a particular input or type of input. In an alternative embodiment, the housing sensor logic 211 may be integrated with the housing sensor components 240. For example, the housing sensor components 240 can be provided as a modular component that includes integrated circuits or other hardware logic, and such resources can provide some or all of the housing sensor logic (see also housing sensor logic 135 of FIG. 1). For example, integrated circuits of the housing sensor components 240 can monitor for touch input and/or process the touch input as being of a particular kind. In variations, some or all of the housing sensor logic 211 may be implemented with the processor 210 (which utilizes instructions stored in the memory 250), or with an alternative processing resource.

In one implementation, the housing sensor logic 211 includes detection logic 213 and gesture logic 215. The detection logic 213 implements operations to monitor for the user contacting a surface of the housing coinciding with placement of the sensor. The gesture logic 215 detects and correlates a particular gesture (e.g., user finger tapping, swiping, etc.) as a particular type of input or user action. The gesture logic 215 can also detect directionality so as to distinguish between, for example, leftward or rightward swipes.

E-Book Housing Configurations

Figure 3A:
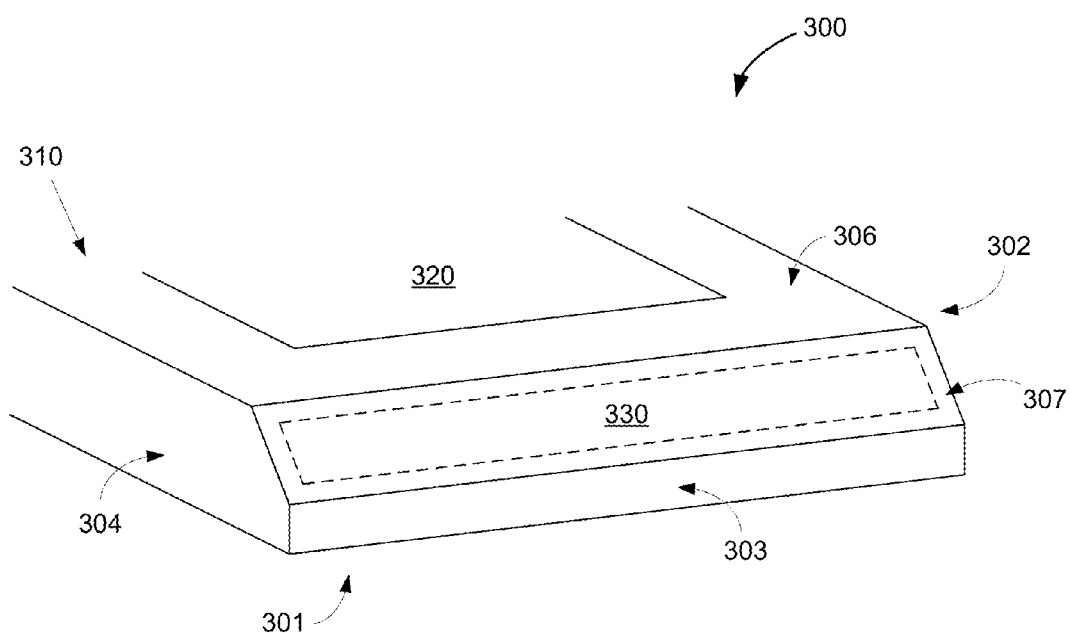
FIG. 3A is a three-quarters view of an e-reader device having a touch-sensitive activation plane, in accordance with some embodiments.

FIG. 3A is a three-quarters view of an e-reader device 300 having a touch-sensitive activation plane, in accordance with some embodiments. The e-reader device 300 includes a housing 310 having a number of surfaces 301-307. More specifically, the housing 310 includes a back surface 301, four side edges 302-305, and a front surface formed from a bezel 306 and an activation plane 307. The e-reader device 300 can be substantially tabular or rectangular, so as to have a front surface that is substantially occupied by a display screen 320 so as to enhance content viewing. The display screen 320 can be part of a display assembly, and can be touch sensitive. For example, the display screen 320 can be provided as a component of a modular display assembly that is touch-sensitive and integrated with housing 310 during a manufacturing and assembly process.

The activation plane 307 may have a substantially different or distinct planar orientation than the remaining housing surfaces 301-306. For example, with reference to FIG. 3B, the activation plane 307 may be formed on a different planar axis than the remainder of the housing 310. That is, the activation plane 307 is not parallel with any of the remaining housing surfaces 301-306. In contrast, the bezel 306 is substantially parallel to the back surface 301, edge 303 is substantially parallel to edge 305, and edge 304 is substantially parallel to edge 302. More specifically, the activation plane 307 may form an obtuse angle (θ) with the bezel 306, and may form another obtuse angle (φ) with the back surface 301. The remaining housing surfaces 301-306, on the other hand, intersect one another perpendicularly.

Figure 3B:
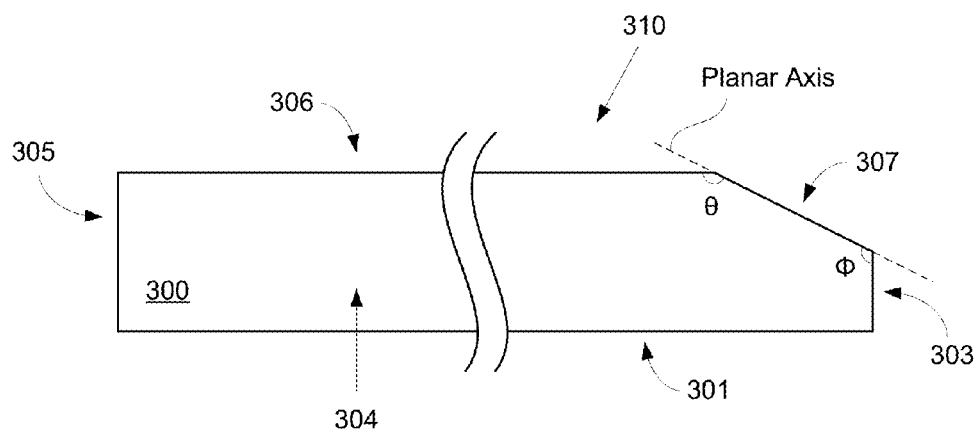
FIG. 3B is a side profile view of the e-reader device depicted in FIG. 3A.

According to examples described herein, the e-reader device 300 includes a touch sensing region 330 provided with the activation plane 307. Specifically, the touch sensing region 330 may coincide with the integration of touch-sensors with the housing 310. For some embodiments, the touch sensing region 330 may substantially (or completely) encompass the surface of the activation plane 307. While the examples of FIGS. 3A-3B provide for a single touch sensing region 330 on the activation plane 307, variations can provide for other surfaces of the housing 310 to be integrated with touch sensors in order to enable touch-sensitivity at any location of, for example, the front and/or back of the device 300.

According to embodiments, the e-reader device 300 can integrate one or more types of touch-sensitive technologies in order to provide touch-sensitivity on both the touch sensing region 330 and on the display screen 320. It should be appreciated that a variety of well-known touch sensing technologies may be utilized to provide touch-sensitivity at either the sensing region 330 and/or on the display screen 320. By way of example, touch sensors used with the touch sensing region 330 or display screen 320 can utilize resistive touch sensors; capacitive touch sensors (using self and/or mutual capacitance); inductive touch sensors; and/or infrared touch sensors. For example, sensing region 330 can be employed using resistive sensors, which can respond to pressure applied to the activation plane 307 of the housing 310 in areas coinciding with the touch sensing region 330. In a variation, the sensing region 330 can be implemented using a grid pattern of electrical elements which can detect capacitance inherent in human skin. Alternatively, sensing region 330 can be implemented using a grid pattern of electrical elements which are placed on or just beneath the surface of the activation plane 307, and which deform sufficiently on contact to detect touch from an object such as a finger. More generally, touch-sensing technologies for implementing the sensing region 330 (and/or display screen 320) can employ resistive touch sensors, capacitive touch sensors (using self and/or mutual capacitance), inductive touch sensors, and/or infrared sensors.

Additionally, the touch sensing region 330 (as well as the display screen 320) can be equipped to detect multiple simultaneous touches. For example, with reference to an example of FIG. 3, a processor of the e-reader device 300 can process input from the sensing region 330 in order to be responsive (or distinctly detect) simultaneous user touch on both the activation plane 307 and another surface of the housing 310 (not shown). For example, the user can pinch the front and back of the e-reader device 300 as a form of input. In such an example, the pinch can be interpreted as a specific type of input (e.g., pinch input) or as a general input (e.g., housing touched).

Figure 4A:
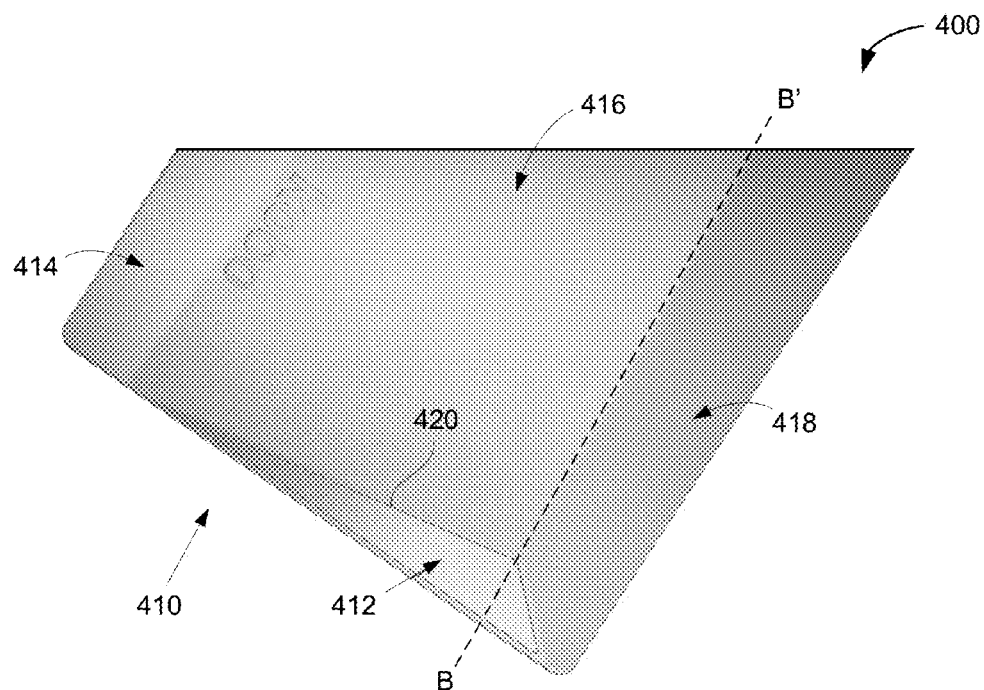
FIG. 4A is a rear view of an e-reader device having a touch-sensitive activation plane, in accordance with other embodiments.

FIG. 4A is a rear view of an e-reader device 400 having a touch-sensitive activation plane, in accordance with other embodiments. More specifically, FIG. 4A shows a back surface of a housing 410 of the e-reader device 400. The back surface of the housing 410 is non-planar, as a whole, but may include a number of individual planes 412-418 (e.g., regions of the housing 410 that are substantially flat or planar). In the example of FIG. 4A, the triangular shaped plane may correspond to an activation plane 412 having a corresponding touch sensing region 420 provided therewith.

As described above, the activation plane 412 may have a substantially different or distinct planar orientation than the other housing planes 414-418. For example, with reference to FIG. 4B, the activation plane 412 may be formed on a different planar axis than the remainder of the housing 410. That is, the activation plane 412 is not parallel with any of the remaining housing planes 414-418. More specifically, the activation plane 307 may form an obtuse angle (θ) with plane 316, and may form another obtuse angle (φ) with a side edge 430 of the housing 410.

In addition to being off-plane, the activation plane 412 also has a distinct shape or geometry compared to the other housing planes 414-418. For example, the activation plane 412 has an asymmetrical (e.g., triangular) shape with a corner that tapers towards housing panel 414. The distinct shape of the activation plane 412 may further help users to identify the activation plane 412 as an input feature. Moreover, the tapered corner may help guide a user's finger toward the sensing region 420 on the back surface of the device 400 while allowing the user's eyes to remain focused on a display screen (not shown) on the front of the device 400.

Figure 4B:
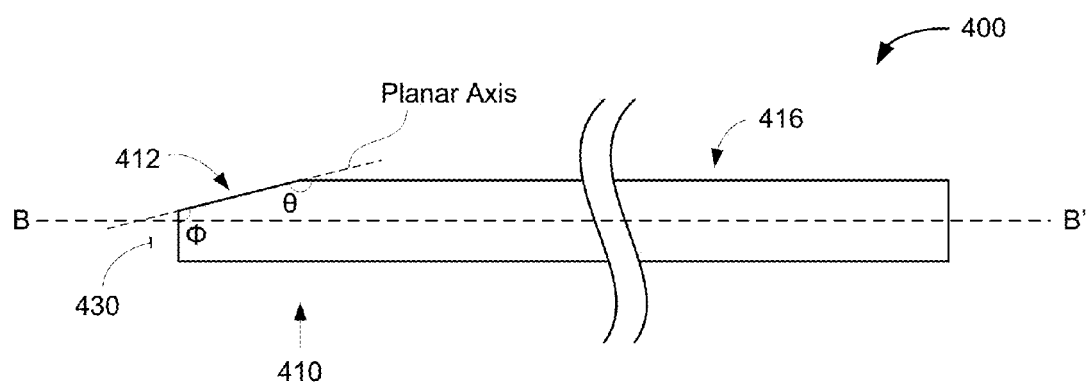
FIG. 4B is a cross-sectional view of the e-reader device depicted in FIG. 4A.

As described above, the touch sensing region 420 may substantially (or completely) encompass the surface of the activation plane 412. Specifically, the touch sensing region 420 may coincide with the integration of touch-sensors with the housing 410. For simplicity, it may be presumed that the touch sensing region 420 performs substantially the same function (e.g., in substantially the same manner) as the touch sensing region 330, as described above with respect to FIG. 3A. While the examples of FIGS. 4A-4B provide for a single touch sensing region 420 on the activation plane 412, variations can provide for other surfaces and/or planes of the housing 410 to be integrated with touch sensors in order to enable touch-sensitivity at any location of, for example, the front and/or back of the device 400.

While examples of FIGS. 3A-3B and 4A-4B illustrate a few possible configurations for the orientation and/or design of an activation plane, variations provide for activation planes having any combination of size, shape, degree, and/or planar orientation in order to help distinguish the activation plane from a remainder of the device housing. For some embodiments, the activation plane may be provided on a front, back, and/or side edge of the device housing, such that a corresponding sensing region is operable by a user (e.g., using one or two hands). Other embodiments contemplate the placement of multiple activation planes on the same e-reader device (e.g., one on the front surface and one of the back surface of the housing). For example, each activation plane may be an exact copy of the other, and may therefore provide more accessibility options (e.g., in the form of redundancy) to the user. In another example, one activation plane may be different from another (e.g., by registering different inputs), and may thus allow for greater degree of functionality.

Page Transition Functionality

Figure 5:
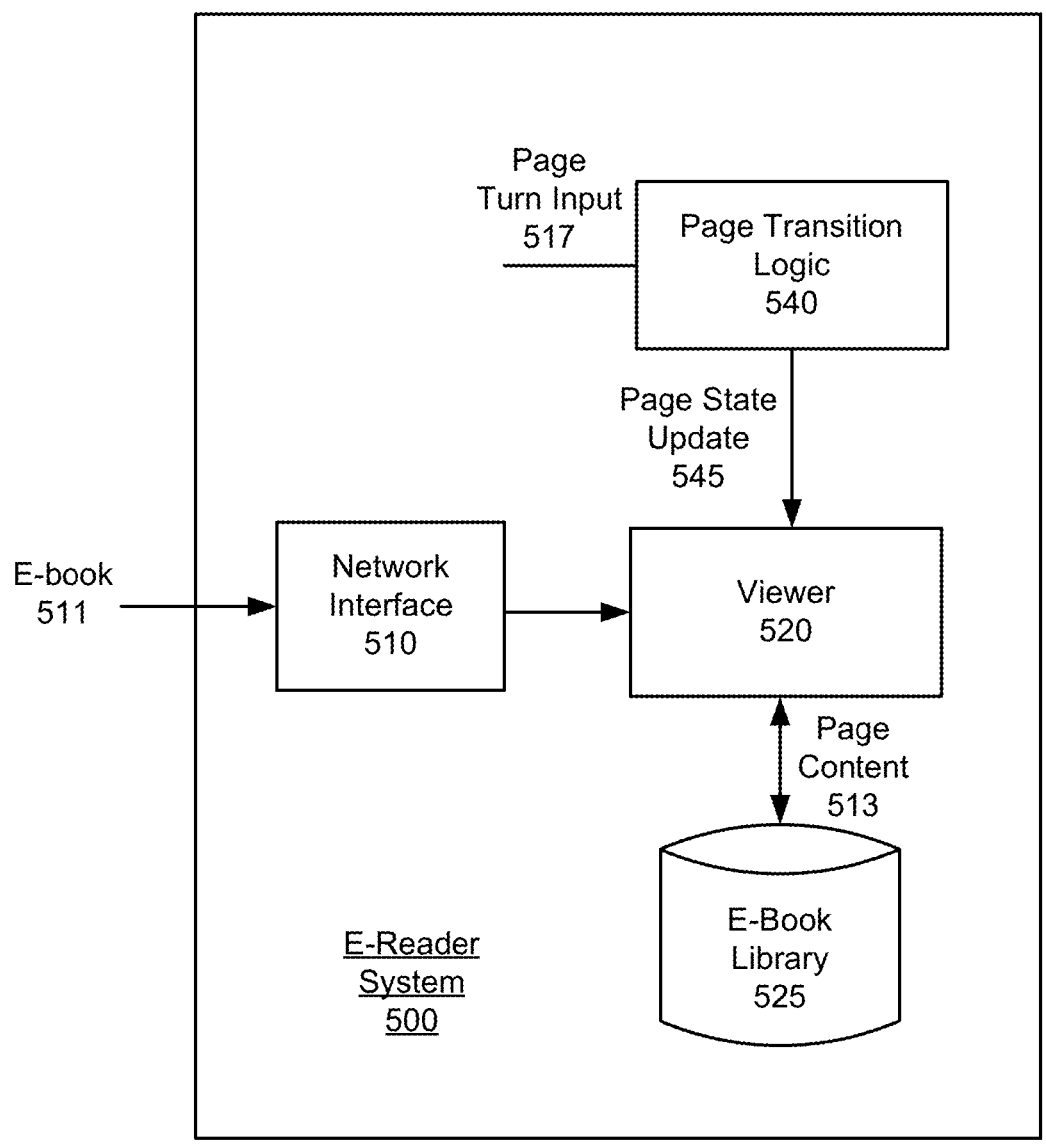
FIG. 5 illustrates an e-reader system for displaying paginated content, according to one or more embodiments.

FIG. 5 illustrates an e-reader system 500 for displaying paginated content, according to one or more embodiments. An e-reader system 500 can be implemented as, for example, an application or device, using components that execute on, for example, an e-reader device such as shown with examples of FIGS. 1, 2, 3A-3B, and 4A-4B. Furthermore, an e-reader system 500 such as described can be implemented in a context such as shown by FIG. 1, and configured as described by an example of FIG. 2, FIGS. 3A-3B, and/or FIGS. 4A-4B.

In an example of FIG. 5, a system 500 includes a network interface 510, a viewer 520 and page transition logic 540. As described with an example of FIG. 1, the network interface 510 can correspond to a programmatic component that communicates with a network service in order to receive data and programmatic resources. For example, the network interface 510 can receive an e-book 511 from the network service that the user purchases and/or downloads. E-books 511 can be stored as part of an e-book library 525 with memory resources of an e-reader device (e.g., see memory 250 of e-reader device 200).

The viewer 520 can access page content 513 from a selected e-book, provided with the e-book library 525. The page content 513 can correspond to one or more pages that comprise the selected e-book. The viewer 520 renders one or more pages on a display screen at a given instance, corresponding to the retrieved page content 513. The page state can correspond to a particular page, or set of pages that are displayed at a given moment.

The page transition logic 540 can be provided as a feature or functionality of the viewer 520. Alternatively, the page transition logic 540 can be provided as a plug-in or as independent functionality from the viewer 520. The page transition logic 540 can signal page state updates 545 to the viewer 520. The page state update 545 can specify a page transition, causing the viewer 520 to render a new page. In specifying the page state update 545, the page transition logic 540 can provide for single page turns, multiple page turns or chapter turns. The page state update 545 for a single page turn causes the viewer 520 to transition page state by presenting page content 513 that is next in sequence (forward or backward) to the page content that is being displayed. The page state update 545 for a multi-page turn causes the viewer 520 to transition page state by presenting page content 513 that is a jump forward or backward in sequence from the page state under display. Likewise, the page state update 545 for a chapter turn causes the viewer 520 to transition page state by presenting page content 513 that is a next chapter in sequence (forward or backward) to a chapter of a current page state. Accordingly, the page state update 545 can signify a transition value representing the page state that is to be displayed next (e.g., one page transition or ten page transition) or a transition type (e.g., page versus chapter transition).

According to some embodiments, the page transition logic 540 can be responsive to different kinds of input, including an input action which signifies page turns (or page transitions) 517. The page turn input 517 can include, for example, single page turns, mufti-page turns and/or chapter turns. The type of page turn input 517 can be determined from the type of input provided. For example, the page turn input 517 can be provided by the user interacting with an activation plane (e.g., touch sensing region) of the device, and single taps on the touch-sensitive display screen can be interpreted as single page turns. Likewise, other input such as touch and hold can be interpreted as a multi-page turn or chapter input. Still further, action such as a tap and swipe can be interpreted as a chapter transition.

In response to receiving a page turn input 517, the page transition logic 540 signals the page state update 545 to the viewer 520. The viewer 520 then updates the page content 513 to reflect the change represented by the page state update 545 (e.g., single page transition, multi-page transition, or chapter transition).

Methodology

Figure 6:
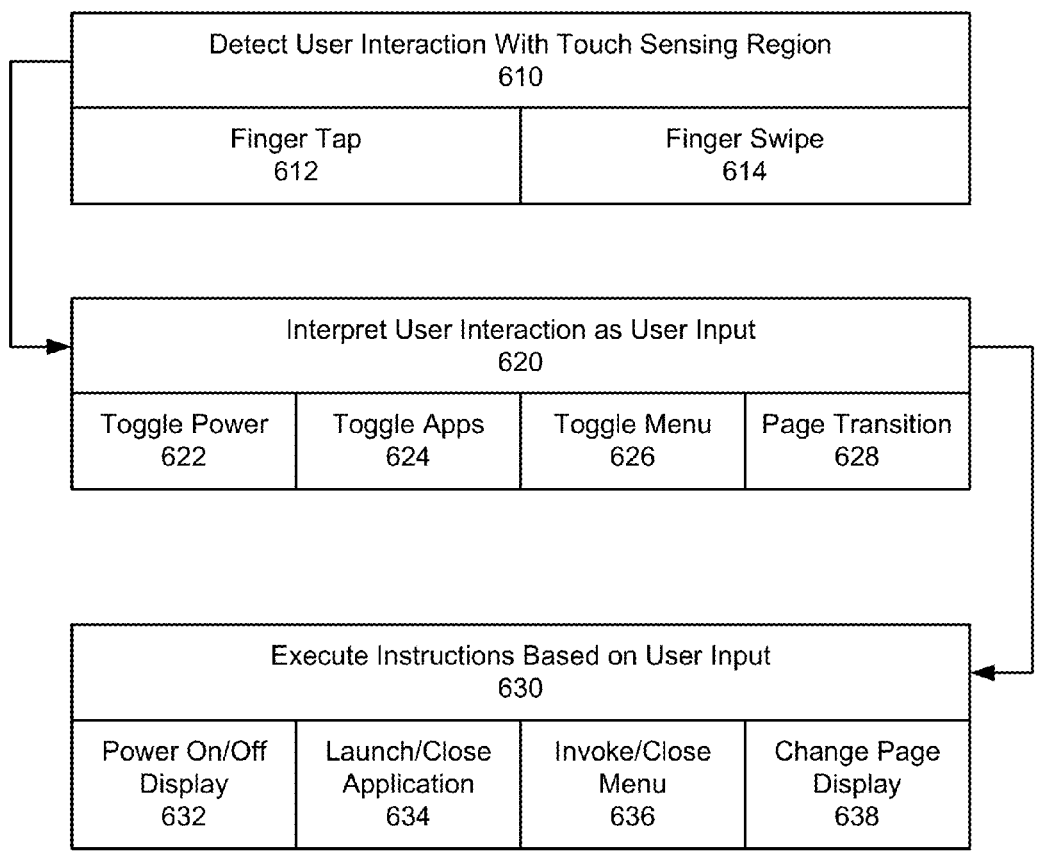
FIG. 6 illustrates a method of operating an e-reader device using a touch-sensitive activation plane, according to one or more embodiments.

FIG. 6 illustrates a method of operating an e-reader device using a touch-sensitive activation plane, according to one or more embodiments. In describing an example of FIG. 6, reference may be made to components such as described with FIGS. 2-4 for purposes of illustrating suitable components for performing a step or sub-step being described.

With reference to an example of FIG. 2, the e-reader device 200 may detect a user interaction with a touch sensing region on a device housing (610). For example, the processor 210 can receive inputs 231 from the housing sensor components 240. More specifically, the processor 210, in executing the detection logic 213, may monitor for finger taps (612) and/or finger swipes (614) on a surface of the housing coinciding with a placement of the sensor. In some embodiments, the housing sensor components 240 may be provided on a portion of a housing of the e-reader device 200 that has a different planar orientation than a remainder of the housing.

With reference, for example, to FIG. 3A, user interaction may be detected by the touch sensing region 330 of the activation plane 307. More specifically, the activation plane 307 may be off-plane relative to the other surfaces of the device housing 310. The distinct planar orientation of the activation plane 307 may help highlight or indicate the touch sensing region 330 as an input feature. In another example, with reference to FIG. 4A, user interaction be detected by the touch sensing region 420 of the activation plane 412. More specifically, the activation plane 412 may be off-plane relative to the other housing planes 414-418 and of a different shape or geometry. The distinct shape of the activation plane 412, in combination with its distinct planar orientation, may help guide a user's fingers to the touch sensing region 420 without having to look at the back of the device 400.

The e-reader device 200 may interpret the detected user interaction as a user input (620). For example, the processor 210 may execute the housing sensor logic 211 to process the input 231, received via the housing sensor components 240, as a particular type of input. More specifically, the processor 210 may implement the gesture logic 215 to correlate a particular gesture (e.g., swiping, tapping, etc.) with a particular type of input, such as, for example: toggling the power of the device and/or display screen (622); toggling one or more applications on the device (624); toggling one or more menus and/or sub-menus on the display (626); and/or transitioning the page of an e-book (628). The gesture logic 215 may also be used to detect the directionality of the user interaction so as to distinguish between, for example, leftward or rightward swipes.

The e-reader device 200 may then execute a set of instructions based on the user input (630). For example, the processor 210 may carry out one or more operations on the device 200 based on the particular type of input detected. For some embodiments, the processor 210 may power on or power off the display screen (632). For other embodiments, the processor 210 may launch or close a particular application (634). Still further, for some embodiments, the processor 210 may invoke or close a system menu or sub-menu (636). In yet another embodiment, the processor 210 may change the e-book page presented on the display screen to a new page, for example, based on a degree and/or magnitude of the user input (638).

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computing device comprising:
   a housing;
   a display assembly including a screen, wherein the housing at least partially circumvents the screen so that the screen is viewable;
   a touch sensor provided with a portion of the housing having a different planar orientation than a remainder of the housing; and
   a processor provided within the housing, the processor operating to:
   detect a first user interaction with the touch sensor when rendering paginated content of an e-book;
   interpret the first user interaction as a page transition input that is indicative of a particular page transition value and of a selection of a page transition type from multiple possible page transition types; and
   execute one or more operations to transition rendering of the paginated content based on the indicated page transition value and the selection of the page transition type.

2. The computing device of claim 1, wherein the first user interaction includes at least one of a finger tap or a finger swipe.

3. The computing device of claim 1, wherein the touch sensor is provided with a portion of the housing that is off-plane with the screen of the display assembly.

4. The computing device of claim 1, wherein the housing includes a non-planar back surface, and wherein the touch sensor is provided on a first plane of the back surface.

5. The computing device of claim 4, wherein the first plane has a different size, shape, or orientation than each remaining plane of the back surface.

6. The computing device of claim 5, wherein the shape of the first plane is asymmetric.

7. The computing device of claim 4, wherein the touch sensor substantially encompasses the first plane of the back surface.

8. The computing device of claim 1, wherein the housing includes a non-planar front surface, and wherein the touch sensor is provided on a first plane of the front surface.

9. The computing device of claim 8, wherein the first plane has a different size, shape, or orientation than each remaining plane of the front surface.

10. The computing device of claim 9, wherein the touch sensor substantially encompasses the first plane of the front surface.

11. The computing device of claim 1, wherein the page transition value is indicative of either a forward page transition or a reverse page transition.

12. The computing device of claim 1, wherein the processor interprets the first user interaction based on one or more characteristics of the first user interaction.

13. The computing device of claim 1, wherein the processor detects the first user interaction as one or more taps, and wherein the one or more characteristics include at least one of a number of taps, a pattern of taps, or a location of multiple taps.

14. The computing device of claim 1, wherein the processor detects the first user interaction as a swipe, and the wherein the one or more characteristics include at least one of a direction of the swipe.

15. The computing device of claim 1, wherein the multiple possible page transition types include at least one of a chapter transition or a page cluster transition.

16. The computing device of claim 1, wherein the page transition value is indicative of either a forward page transition or a reverse page transition.

17. A method for operating a computing device, the method being implemented by one or more processors and comprising:
   detecting a first user interaction with a touch sensor when rendering paginated content of an e-book, wherein the touch sensor is provided with a portion of a housing of the computing device that has a different planar orientation than a remainder of the housing;
   interpreting the first user interaction as a page transition input that is indicative of a particular page transition value and of a selection of a page transition type from multiple possible page transition types; and
   executing one or more operations to transition rendering of the paginated content based on the indicated page transition value and the selection of the page transition type.

18. The method of claim 17, wherein the multiple possible page transition types include a chapter transition, a page cluster transition, and a single page transition.

19. A non-transitory computer-readable medium that stores instructions, that when executed by one or more processors of a computing device, cause the computing device to perform operations that include:
   detecting a first user interaction with a touch sensor when rendering paginated content of an e-book, wherein the touch sensor is provided with a portion of a housing of the computing device that has a different planar orientation than a remainder of the housing;
   interpreting the first user interaction as a page transition input that is indicative of a particular page transition value and of a selection of a page transition type from multiple possible page transition types; and
   executing one or more operations to transition rendering of the paginated content based on the indicated page transition value and the selection of the page transition type.

20. The non-transitory computer-readable medium of claim 19, wherein the multiple possible page transition types include a chapter transition, a page cluster transition, and a single page transition.

* * * * *